United States Patent
Jennissen et al.

(10) Patent No.: US 11,001,524 B2
(45) Date of Patent: May 11, 2021

(54) PROCESS FOR PRODUCING CEMENT USING A SECONDARY FUEL

(71) Applicant: SUBCOAL INTERNATIONAL B.V., Farmsum (NL)

(72) Inventors: Lars Jennissen, Nieuw Bergen (NL); Neville Roberts, Oakham Rutland (GB)

(73) Assignee: Subcoal International B.V., Nieuw-Bergen (NL)

(*) Notice: Subject to any disclaimer, the term of this patent is extended or adjusted under 35 U.S.C. 154(b) by 373 days.

(21) Appl. No.: 15/740,014

(22) PCT Filed: Jun. 30, 2016

(86) PCT No.: PCT/EP2016/065444
§ 371 (c)(1),
(2) Date: Dec. 27, 2017

(87) PCT Pub. No.: WO2017/001638
PCT Pub. Date: Jan. 5, 2017

(65) Prior Publication Data
US 2018/0194681 A1     Jul. 12, 2018

(30) Foreign Application Priority Data

Jul. 2, 2015 (NL) ...................................... 2015080

(51) Int. Cl.
*C04B 7/44*     (2006.01)
*C10L 5/36*     (2006.01)
(Continued)

(52) U.S. Cl.
CPC ............ *C04B 7/4423* (2013.01); *C10L 5/363* (2013.01); *C10L 5/40* (2013.01); *C10L 5/403* (2013.01);
(Continued)

(58) Field of Classification Search
CPC .................................................... C04B 7/4423
See application file for complete search history.

(56) References Cited

U.S. PATENT DOCUMENTS

| 4,059,393 A | 11/1977 | Kobayashi |
| 4,226,586 A | 10/1980 | Brachthauser et al. |
| (Continued) | | |

FOREIGN PATENT DOCUMENTS

| DE | 19749183 A1 | 5/1999 |
| EP | 1083212 A1 | 3/2001 |
| (Continued) | | |

OTHER PUBLICATIONS

The Priority Search Report for NL2015080 dated Mar. 15, 2016.
(Continued)

*Primary Examiner* — Nathaniel Herzfeld
(74) *Attorney, Agent, or Firm* — David P. Owen

(57) ABSTRACT

The invention provides a process for producing cement, the process comprising providing heat to a cement manufacturing process using a secondary fuel, wherein the secondary fuel comprises cellulose and plastic and is in the form of pellets of a size between about 3-25 mm thickness, having a calorific value of about 16 GJ/ton or more, and wherein said secondary fuel is supplied at a place between the kiln inlet and the first cyclone, wherein after formation of the cement clinker, the cement clinker is cooled and milled to cement powder. Preferably, the secondary fuel is supplied to the riser pipe or to a pre-kiln combustion chamber. Generally, the secondary fuel is provided at a place which allows the pellets to burn before coming in contact with the cement materials in the kiln, while it also does not rise into the cyclone, thereby preventing blocking of the cyclones.

18 Claims, 2 Drawing Sheets

(51) Int. Cl.
*C10L 5/40* (2006.01)
*C10L 5/44* (2006.01)

(52) U.S. Cl.
CPC ............... *C10L 5/406* (2013.01); *C10L 5/44* (2013.01); *C10L 5/442* (2013.01); *C10L 5/445* (2013.01); *C10L 2250/06* (2013.01); *Y02E 50/10* (2013.01); *Y02E 50/30* (2013.01); *Y02P 40/125* (2015.11)

(56) References Cited

U.S. PATENT DOCUMENTS

| | | | |
|---|---|---|---|
| 4,372,784 A | | 2/1983 | Hess |
| 4,529,407 A | * | 7/1985 | Johnston .................. C10L 5/14 44/542 |
| 4,913,742 A | * | 4/1990 | Kwech .................... C04B 7/434 106/745 |
| 5,342,418 A | * | 8/1994 | Jesse ........................ C10L 5/40 44/589 |
| 5,643,342 A | * | 7/1997 | Andrews .................. C10L 5/40 44/530 |
| 5,707,444 A | * | 1/1998 | Hundebøl ............... C04B 7/361 106/739 |
| 6,287,110 B1 | * | 9/2001 | Ramesohl ............... C04B 7/434 432/106 |
| 6,635,093 B1 | * | 10/2003 | Schoen ................. B30B 11/201 44/553 |
| 7,960,325 B2 | * | 6/2011 | Kluko ...................... C10L 5/44 508/553 |
| 2005/0066860 A1 | | 3/2005 | Logan et al. |
| 2007/0122762 A1 | * | 5/2007 | Hoffis ................... F27B 7/2033 432/106 |
| 2010/0050906 A1 | * | 3/2010 | Schurmann ............. C04B 7/364 106/771 |
| 2012/0009530 A1 | | 1/2012 | Jensen et al. |
| 2012/0032452 A1 | | 2/2012 | Kuku |
| 2012/0174832 A1 | * | 7/2012 | Mathai ................... C04B 7/367 106/817 |

FOREIGN PATENT DOCUMENTS

| | | |
|---|---|---|
| EP | 2307531 B1 | 2/2012 |
| GB | 1506863 A | 4/1978 |
| WO | 83/03601 A1 | 10/1983 |
| WO | 2008/106993 A1 | 9/2008 |

OTHER PUBLICATIONS

International Search Report for PCT/EP2016/065444 dated Aug. 19, 2016.
International Preliminary Report on Patentability for PCT/EP2016/065444 dated Jan. 2, 2018.
Kääntee, Ursula et al, "Modelling a cement manufacturing process to study possible impacts of alternative fuels", Jun. 20, 2002, available at: https://www.researchgate.net/publication/228405258.
Kääntee, Ursula et al, "Cement manufacturing using alternative fuels and the advantages of process modelling", Fuel Processing Technology, vol. 85, Issue 4, Mar. 15, 2004, pp. 293-301.

* cited by examiner

PROCESS FOR PRODUCING CEMENT USING A SECONDARY FUEL

CROSS REFERENCE TO RELATED APPLICATIONS

This application is a 371 of PCT application number PCT/EP2016/065444 filed on Jun. 30, 2016, which claims priority from the Netherlands patent application number 2015080 filed on Jul. 2, 2015. All applications are hereby incorporated by reference in their entireties.

The present invention concerns a process for producing cement using a secondary fuel.

BACKGROUND OF THE INVENTION

There are basically two types of cement manufacturing processes: the wet process and the dry process. In the wet process, the raw material is blended with water to produce a slurry which is pumped directly into the cold end of the kiln. The slurrying process helps homogenize the material. The wet process is the most energy intensive, because the water must be evaporated out of the slurry mixture and the heat exchange equipment is less efficient.

In the dry kiln process, the raw material enters the kiln in a dry powdered form.

Several types of kilns utilize the dry process. The pre-heater kiln features a tower of heat-exchanging cyclones. The raw material enters the pre-heater in a dry powdered form where it is pre-heated by the hot exit gases from the kiln prior to entering the kiln chamber. The preheater kiln can be provided with a combustion chamber at the base of the preheater tower, which promotes further drying and calcination of the material before entering the kiln by accommodating a second flame in the clinker producing system. Another type of kiln is referred to as the long dry kiln and feeds dry raw material directly into the upper end of the kiln. This third type is rather outdated, and dry kiln processes using heat-exchanging cyclones are most common.

The pre-heater kilns that are provided with a combustion chamber can use in said combustion chamber, primary fuel, like coal, and/or secondary fuel like (shredded) tires, fluff of refuse derived fuel and the like. Because burning is confined to a specific combustion chamber, the combustion chamber can be adapted to the fuel intended to be used. In dry kiln processes without such additional combustion chamber, some secondary fuel can be added in the riser pipe, but this is largely limited to tires or shredded tires.

Cement kilns are basically tilted rotating cylinders lined with heat-resistant bricks. The raw feed material mixture is fed into the higher, elevated or "cool" end of the kiln also known as the kiln inlet. As the kiln slowly rotates, the raw meal tumbles down toward the hot lower, or "flame" end, gradually altering physically and chemically in the intense heat to form clinker.

The clinker, which are small balls of 10-15 mm diameter, are cooled on the grate cooler, and milled. The cement powder generally is diluted with gypsum, to regulate the hardening time.

The extraordinarily high temperatures involved in producing cement require large amounts of energy. The high temperatures in cement kilns (as high as 1500° C. or greater in the kiln materials; the primary combustion flame generally has a temperature up to 2000° C. while the molten cement clinker has a temperature between 1400 and 1500° C.) result in the formation of NOx, which is primarily a product of the thermal oxidation of nitrogen gas in the combustion air. Cement kilns use a variety of methods to minimize NOx production, including injection of ammonia.

Manufacturing one ton of cement requires an average of 4.4 million Btu-roughly equal to 100 kilograms of coal, or more. Typically, the energy of between 110 to 150 kgs of coal is used for the production of one ton of clinker. Cement kilns use so-called primary fuels, like coal, oil, petroleum coke, natural gas and often so-called secondary fuels, like waste derived fuel. Waste derived fuels may include waste oil, paints, solvents, and shredded tires. Most cement kilns burning hazardous waste use it to supplement—rather than replace—conventional (primary) fuel in particular in the kiln, because the consumption is limited by permit conditions which are guided by the EU Waste Incineration Directive Burning in the combustion chamber in the pre-heater tower, or by the addition of tires in a riser pipe allows the supplementation of heat at temperatures below 1000° C., and hence lowering the NOx production. The temperature of the gas leaving the kiln generally is between 800 and 1000° C.

The air used for combustion is provided by a fan (generally called exhaust fan or final fan), which sucks the air from the kiln through the cyclones, while the to-be calcinated raw materials for the cement are provided in the top cyclones. The raw materials are dried and heated in the cyclones, while falling through the cyclones on its way to the kiln, and the final calcination takes place in the rotating kiln.

Cement plants use (powdered, pulverised) coal or cokes, oil or gas, all primary fuel, for firing the kiln. Also, certain amounts of alternative fuels are used. The alternative fuel may range from old tires, sewage sludge, refuse derived fuel and the like.

The use of secondary fuel has proven to be causing complications in the process. Preferably, the secondary fuel is used without the need of substantial investments. Further, clinker production should not be compromised. However, generally, the clinker production is complicated by the use of secondary fuel: Secondary fuel may cause fouling of cyclones, may cause sulphur dioxide formation in the cement materials and the like. Hence, several suggestions have been made for safely using secondary fuels.

DE19749183 suggests to provide an additional rotating pipe as a furnace for burning old tires and/or other secondary fuel, and to transport the heated air to the primary kiln.

US2005/066860 describes the use of organic waste material containing substantial amounts of minerals as a source of fuel and minerals for cement, to be provided into the rotating kiln.

WO1983/03601 provides a kiln with a primary combustion zone at the heart of the kiln, and a secondary combustion zone for slow burning fuel before the entrance of the kiln. The slow burning fuel enters the kiln, to burn in the presence of the to be calcinated materials.

US2012/009530 provides for an improvement over WO1983/03601 by keeping the burning secondary fuel separate from the cement raw materials in the rotary kiln.

Modelling of a cement manufacturing process is described by U. Kaantee, https:/www,researchgate.net/publication/228405258. The authors suggest that the changing fuel requires process changes, in particular the amount of air may need adaption.

It is an object of the invention to provide a process for cement manufacture that allows using secondary fuel for a process essentially precluding manufacturing complications, which can be easily implemented without large investments.

SUMMARY OF THE INVENTION

It is an object of the invention to provide a process for producing cement, the process comprising providing heat to a cement manufacturing process using a secondary fuel, wherein the secondary fuel comprises cellulose and plastic and is in the form of pellets of a size between about 3-25 mm thickness, having a calorific value of about 16 GJ/ton or more, and wherein said secondary fuel is supplied at a place between the kiln inlet and the first cyclone, wherein the cement clinker is cooled and milled to cement powder.

Thus, the invention provides for a process that improves the use of secondary fuel. After forming clinker in the kiln, the cement clinker is cooled and milled.

Preferably, the secondary fuel is supplied to the riser pipe or to a pre-kiln combustion chamber.

Generally, the secondary fuel is provided at a place which allows the pellets to burn before coming in contact with the cement materials in the kiln. In case the secondary fuel would enter the kiln, it would be covered with cement raw material such that the fuel burns without sufficient oxygen, causing for example detrimental carbon monoxide formation, discoloration of the cement, and processing problems with sulphur.

The invention furthermore provides for the use of said secondary fuel for providing heat in a process for producing cement, wherein the secondary fuel is supplied at a place between the kiln inlet and the first cyclone.

Preferably, the secondary fuel is substantially completely burned, while not entering the cyclone or the kiln. Hence, the secondary fuel is sufficient light, to be blown away from the kiln, while it is sufficiently heavy (has sufficiently high density) that the secondary fuel is not sucked into the cyclones. If secondary fuel enters the cyclones, burning of said fuel will cause processing problems, and ultimately even may cause hard build-up in the cyclones, which is detrimental to the process.

The amount of pellets that can be used in this way is substantial, and for example 3% or more of the energy requirement of a cement plant can be provided in this way. Preferably, about 10% of the energy requirement is provided with such secondary fuel.

Generally, the amount will be about 50% of the total energy requirement or less, and often about 20% or less may be preferred for easy processing. In an optimized process, it may be possible to use up to 70% of the energy in the dryer and cyclones, which can be fully or partly supplied by the pellets as described.

It was unexpected that the pellets could be burned in this way without showing any blocking of the cyclones, which could be the case if the burning pellets would be sucked into the cyclone. Also, the quality of the cement was good, and virtually no pellets were burning in the cement materials in the kiln. Burning of the fuel in the cement materials would cause development of sulphur compounds, like sulphur dioxide. The development of sulphur dioxide may cause operational problems because $SO_2$ will enter the cyclones and may form fine powder with salts, or it may be reduced to sulphur, both of them may deposit on the cyclone walls and cause blockage. Also, substantial amounts of $SO_2$ in the cement deteriorate the quality of the cement. Further, secondary fuel in the clinker material may cause discoloration of the cement and carbon monoxide formation.

An advantage of the use of the pellets with substantial amount of plastic is that the calorific value can be substantially higher than that of wood pellets or sewage sludge pellets, which are in practise not used in the section before the kiln.

Furthermore, processing is easier, also because the pellets burn much faster and cleaner than for example tires. Hence, the secondary fuel used in accordance with the present invention has a clear advantage over the use of shredded tyres because of cleaner processing and less chance of burning of secondary fuel in the cement clinker.

In case the pellets are provided in a riser pipe, the high calorific value is furthermore an advantage because a relatively high burning efficiency can be reached, allowing a larger part of the primary fuel in the kiln to be replaced by this secondary fuel. This is particularly preferred in a preheater kiln, i.e. a kiln without a pre-kiln combustion chamber.

In case the pellets are provided to a pre-kiln combustion chamber, the efficiency of the burner does not have to be compromised, or at least is less compromised, than with the use of other, poor grade alternative fuels, like for example plain wood pellets.

Further, these pellets can be relatively dense and hard, meaning that these can be easily and effectively transported.

DETAILED DESCRIPTION OF THE INVENTION

Figure 1:
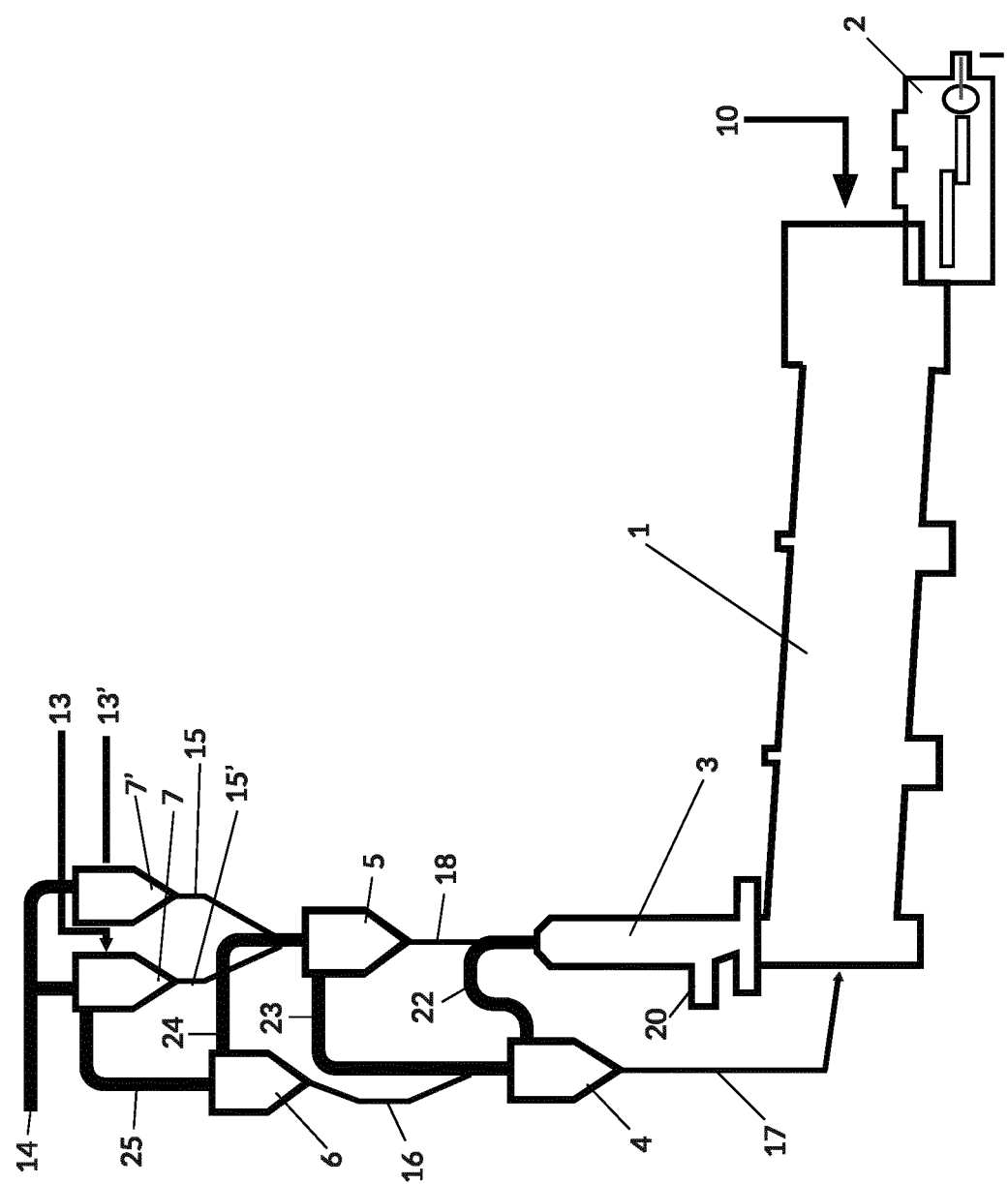
FIG. 1 is a schematic representation of a cement kiln without a pre-kiln combustion chamber, in which the process of the present invention can be performed.

The invention provides a process for the production of cement, wherein heat is provided to a cement manufacturing process using a secondary fuel, wherein the secondary fuel comprises cellulose and plastic and is in the form of pellets of a size between about 3-25 mm thickness, having a calorific value of about 16 GJ/ton or more, and wherein said secondary fuel is supplied at a place between the cement inlet of the kiln and the first cyclone, whereafter cement clinker is produced in a cement kiln, and the cement clinker is cooled and milled to cement powder.

As explained, preferably, said secondary fuel is supplied to the riser pipe or to a pre-kiln combustion chamber at a place which allows the pellets to burn before coming in contact with the cement materials in the kiln (i.e. the raw materials in the kiln, where the raw materials will cover the secondary fuel particles).

The invention furthermore provides for said process wherein said secondary fuel is provided at a place where it is completely burned in the riser pipe, while it is sufficiently heavy (has sufficiently high density) that the secondary fuel is not sucked into the cyclones.

In one preferred embodiment, the invention further provides a process, wherein the pellets are provided to the riser pipe of a cement operation without an additional combustion chamber.

In another preferred embodiment, the invention provides for a process, wherein the pellets are provided to a combustion chamber which is present in the drying tower of a cement operation.

The air for burning fuel in the kiln and the pre-heating tower is provided by a fan (generally called exhaust fan or final fan), which sucks the air from the kiln through the cyclones to for example a bag filter. The heated air is used to heat the cement raw materials in the heat-exchanger cyclones, but it may also transport small particles through the kiln and the cyclones.

The air will be heated in the primary flame of the kiln to about 1500° C. Generally, the temperature of the primary flame can be up to 2000° C. in order to heat the cement clinker to a liquid state at about 1400-1500° C., like about 1450° C. Generally, the temperature of the air at the outlet of the kiln will be about 1000° C. or lower, like for example between 800-1000° C., and this is sufficiently hot to allow self-ignition of the pellets.

The Pellets

The pellets used in the present invention comprise cellulose and plastic and generally have a size of about 3-25 mm thickness or larger, generally have a calorific value of about 16 GJ/ton or more, and preferably have a percentage moisture relative to dry pellets of about 15 w % or less and preferably have an ash content of about 20 wt % or less.

Preferably, the bulk density (tapped) of the pellets is about 350 kg/m$^3$ or higher, preferably about 400 kg/m$^3$, such as for example about 430 or 450 kg/m$^3$. Generally, the density is about 600 kg/m$^3$ or lower, for example about 550 kg/m$^3$ or lower. It may be noted that fluff (non-pelleted waste, suitably for burning) generally has a density between 150 and 200 kg/m$^3$ and sometimes somewhat higher, but to the best of the knowledge of the inventors never higher than 300 kg/m$^3$.

The average density of the pellets itself generally is between 0.7 kg/dm$^3$ to 1.3 kg/dm$^3$. Preferably, the average density is about 0.8 kg/dm$^3$ and 1.2 kg/dm$^3$. Generally, the pellets have slightly varying densities, in the range between 0.7 to 1.3 kg/dm$^3$, like for example about 0.8, about 0.9 about 1.0 or about 1.1 kg/dm$^3$. In case pellets are put in tap water, most pellets will just float, but some sink. This density range will facilitate the burning of pellets in the kiln riser in most cement kiln applications.

Preferably, the strength of the pellets is about 5 kgf or more, preferably about 8 kgf or more, more preferably about 10 kgf or more. Generally, the strength is about 40 kgf or less, often about 25 kgf or less. It is however possible to have even harder pellets, for example having a strength of up to 70 kgf or less, for example 60 kgf or less. It may be preferably to have a strength of about 30 kgf or less. The hardness can be measured with a Kahl pellet hardness tester, available from Amandus Kahl GmbH&Co KG, Hamburg. A sufficient strength has the advantage that the pellets have a relatively high density, which allows efficient transport, and the strength precludes the formation of large amounts of fines during the transport. The Kahl pellet hardness tester is one of the standard test methods in the industry.

The calorific value of the pellets generally is about 16 GJ/ton or more, and is preferably about 18 GJ/ton or more, 20 GJ/ton or more, and can be for example 21 GJ/ton, 22 GJ/ton or about 23 GJ/ton. For secondary fuel pellets, the calorific value is given as the gross calorific value. The calorific value generally is about 25 GJ/ton or less. The calorific value is also dependent on the amount of plastic material in the pellet, and a higher calorific content reflects a higher plastic content. The calorific value will be lowered by the amount of ash.

The moisture content of the pellets relative to dry pellets is about 15 wt % or less, preferably about 10 wt % or less, and most preferable about 7 wt % or less. Generally, the moisture content will be about 1 wt % or more, and often about 2 wt % or more The ash content of the pellets generally is about 20 wt % or less, preferably about 18 wt % or less, more preferable about 15 wt % or less, and most preferable about 13 wt % or less. Generally, the ash content will be about 4 wt % or more, and often about 6 wt % or more, but a lower ash content is preferred.

The pellets can be prepared from waste mixtures. Cellulose/plastic waste mixtures originate for example from industrial, domestic, urban or municipal waste. This stream often comprises a relatively high percentage inert material, in particular sand. Also, there exists waste from a paper recycling process. In the latter case the waste mixture, the so-called reject stream, is obtained after pulping and separating out the paper pulp in the paper recycling process, and still comprises, in addition to plastic, paper waste.

The mixture of cellulose/plastic waste particles for use in the present method may be any waste mixture comprising cellulose- and thermoplastic materials. Preferably, cellulose and thermoplastic materials constitute an important part of the components of the waste mixture, and preferably they constitute in total at least 30 weight % of the waste mixture, more preferably at least 40 weight %, and most preferably at least 50 weight %, based on the total amount of solid components. However, pre-treated waste streams may be used comprising about 70 weight % or more, or even about 80 weight % of cellulose/plastic waste material.

In general, the cellulose/plastic waste mixture originates from domestic waste (including municipal and urban waste) and/or industrial waste streams. The cellulose material may originate from for example paper, cardboard, cardboard cups, wood, diapers, bandages, and textile, such as cotton, viscose and rayon. The cellulose material may comprise organic material, such as bread, meat and vegetable waste etc., which are in fact treated as cellulose fibre.

The thermoplastic material may originate from for example packaging material such as polymeric foil material. In principle all types of thermoplastic polymers may be present in the cellulose/plastic mixture. Examples of thermoplastic polymers which are in general present, are (substituted) polyolefins; polystyrene; polyesters, such as polyethene terephthalate (PET); polyamides, and copolymers and mixtures thereof. The thermoplastic material may also include halogenated polymers such as poly(vinylchloride) (PVC), although this is not preferred. In a preferred embodiment, most of the chlorine-containing polymer material is removed.

The thermoplastic material in the cellulose/plastic waste mixture is generally mainly based on polyethene homo and/or copolymers. Usually, the thermoplastic material comprises for at least 60 weight %, preferably at least 70 weight %, more preferably at least 75 weight % and most preferably at least 80 weight % of polyethene homo and/or copolymers.

An industrial waste stream which can be applied for obtaining a cellulose/plastic waste mixture for making suitable pellets, is the paper reject stream which is obtained after separating out the majority of the paper pulp in the paper recycling process. As with municipal waste streams, this waste stream contains plastic foils, metal, and other undesirable materials.

Usually, the mixture of cellulose/plastic waste particles for use with the present method comprises 10 to 85 weight % of thermoplastic material and 15 to 90 weight % of cellulose material, each based on the total dry weight of the cellulose and thermoplastic materials. The actual composition boundaries of the mixture depend on the initial moisture content of the mixture and the desired moisture content of the mixture when it leaves the dryer.

In a first preferred embodiment of the invention, a waste stream is used which is obtained from municipal waste (MSW, municipal solid waste). Such a stream contains in general 15-30% of moisture, and usually 20-25% of moisture. Furthermore, this stream contains relatively much inert material, usually about 15 weight % or more, and often 15-20 weight %. Also, this stream may contain some organic material which may be considered equivalent to cellulose fibre for the purpose of this invention. Preferably, the organic component of the waste material (exclusively waste based on cellulose, such as paper and cardboard) amounts to less than 30 weight %, preferably less than 20 weight %, and more preferably less than 10 weight %.

In a second preferred embodiment of the invention a waste stream is used which is obtained from paper recycling waste. Such a stream contains in general 30-65 weight % of moisture, and usually 40-60 weight % of moisture. Additionally, this stream contains a relatively high amount of chlorine-containing material, usually about 1 weight % or more, and usually 1-2 weight %, but sometimes even 2.5 weight % or more. The amount of inert material is generally less than in MSW, and is in general less than 15 weight %, and usually less than 10 weight % (on dry matter basis).

It may be useful to mix waste streams, and for example to add paper rejects to the MSW waste, add a plastic fraction to paper reject or the like.

Cellulose/plastic waste mixtures may be processed into fuel pellets. In order to obtain a combustible material, the treatment of the cellulose/plastic waste mixture comprises several purification steps. With the waste streams from the paper processing—containing a lot of water—part of the water is removed from the cellulose/plastic waste mixture by pressure.

For most sources of waste, generally, moisture is removed by thermal drying. Although, drying is not necessary if a waste stream is used that is sufficiently dry.

Apart from cellulose and thermoplastic materials, the mixture of cellulose/plastic waste particles for use in the present method comprises also other materials, such as metals, stones, for example sand, ceramic material or glass. It is preferred to remove these contaminants as much as feasible because they may impede the further processing of the cellulose/plastic waste mixture, for example a pelletizing step and to obtain a useful fuel. Since these materials cannot burn (hereafter also called not-combustible materials), they decrease the calorific value of the fuel and increase the ash content. The cellulose/plastic waste mixture may also contain thermo hardening materials (resins), which are usually combustible and therefore do not need to be removed. Yet, these resinous materials are generally difficult to pelletize, and larger parts are therefore also preferably removed and/or ground to small particles, of for example sizes of less than 10 mm.

Generally, at least heavy, large and/or non-combustible material is removed, such as large stones, concrete, pieces of metal and the like. For that purpose sieving may be appropriate, but also manual sorting on a sorting belt or a process in which the light (paper-plastic) fraction is sorted from other materials by means of air classification. With paper reject waste streams this step is in general not necessary. Furthermore, from waste treatment companies (e.g. from material recovery or sorting facilities) waste streams are available that lack such heavy material. Preferably, the large ferro and non-ferro metal parts may be removed at this stage with a magnet and an Eddy-current system.

In a further pre-processing step the waste is treated in a shredder to obtain particle material of a certain size, such as for example all parts smaller than 200 mm, preferably about 150 mm or less, such as, for example about 100 mm, about 120 mm or about 80 mm. In general, the size is given as a length, which implies that 95 weight % of the material has a maximum size in one dimension of the given length. It is possible to cut the material in still smaller pieces (for example less than 50 mm), but this is not preferred because of the presence of solid material residues, such as glass, stone, etc., which lead to excess wear and which may damage the shredder. In this stage of the method, the cutting occurs in general into pieces of about 60 mm or more, preferably about 80 mm or more. Of course, the waste stream will always still contain smaller parts, but these are not necessarily cut up in the shredder.

The removal of chlorine-containing foil parts generally is performed in a separate step. Such separation step preferably comprises an optical sorting of chlorine containing foil or parts. For example a NIR analysis-apparatus locates chlorine comprising components on a belt, after which an automatic removal device specifically takes out the plastic parts. The removal device can be pressurized air, blowing the pieces of plastic from the belt, or a picking device. Additionally, for an efficient separation, preferably the size of the foil parts is about 60 mm or more. Usually, the size will be smaller than 25 cm, preferably about 15 cm or less. Many smaller parts, such as smaller than 30 mm may also be purified, however, it is more difficult to achieve an efficient purification.

Generally, the waste stream is dried, for example on a belt dryer, or in a trommel drier, to a suitable percentage moisture, that allows to prepare pellets with the required amount of moisture. Generally, the waste stream is dried to a moisture percentage (on dry weight) of 5-20 wt %. Pelletizing can be done in a way that leads to pellets with less than 15 wt % moisture, preferably less than 10 wt % moisture.

After drying, wind sieving, removal of small metal parts, further removal of chlorine containing plastic and the like can be done as fit.

In a particulate embodiment, the pellets can be made from cellulose/plastic mixtures wherein the content of thermoplastic material is at least 40 weight %. In this embodiment high-calorific fuel may be obtained from the cellulose/plastic waste mixture. It may be desirable, prior to making pellets, to add some thermoplastic material, usually chlorine-free, to increase the calorific value of the fuel obtained from the cellulose/plastic waste mixture, and/or to lower the chlorine content of the cellulose/plastic waste mixture.

In a further embodiment, the pellets contain sufficient plastic material, which is sufficiently molten during the pelletizing step, that the pellets are hydrophobic (i.e. repel water). This has the advantage that the pellets can just be stored outside, without shelter, like for example in the same bunkers as the coal or cokes. Generally, the pellets are sufficiently hydrophobic when they contain about 40 wt % of plastic, preferably about 50 wt % of plastic.

In still another embodiment the pellets can be made from a cellulose/plastic waste mixture wherein the cellulose represents 20 to 70 weight % and the thermoplastic material represents 70 to 20 weight %. There is a specific need for an efficient treatment of such a mixed waste stream because it is difficult to separate out cellulose or plastic in an efficient manner.

Further processing of the mixture of cellulose/plastic particles comprises among others compacting prior to storage. The latter compacting method is preferably carried out in a pelletizing device, which produces pellets with a diameter of preferably about 25 mm or less, more preferably about 20 mm or less, such as for example 16, 12 or 8 mm. Generally, the diameter of the pellets will be about 3 mm or more, preferably about 5 mm or more. Generally, the length of the pellets will be between about 2 mm and about 30 mm. A method which is well applicable, is described in EP-A-1 083 212 as well as in U.S. Pat. No. 5,342,418. Other references with suitable pelletizing processes include WO2008/106993 and EP-B-2307531.

The pellets can easily be stored and transported to another location for further use.

In another embodiment, compacting into pellets with a diameter (thickness) of about 25 mm or less is performed in the form of soft pellets. Such pellets can still be well transported and may also be used in the process of the present invention.

The invention further relates to the use of pellets comprising cellulose and plastic, having a size of about 3-25 mm thickness, and having a calorific value of about 16 GJ/ton or larger, as secondary fuel in a process for the manufacture of cement, wherein the secondary fuel is provided in the process as whole pellets, in the riser pipe or in a combustion chamber in the pre-heater tower.

This use of the pellets preferably is done with pellets of which the preferences are described above, in a process with the preferences as described above. A skilled person will understand that all these preferences can be combined.

The Figures

FIG. 1 is a schematic representation of a cement kiln without a combustion chamber in the pre-heater tower, in which the process of the present invention can be performed.

Figure 2:
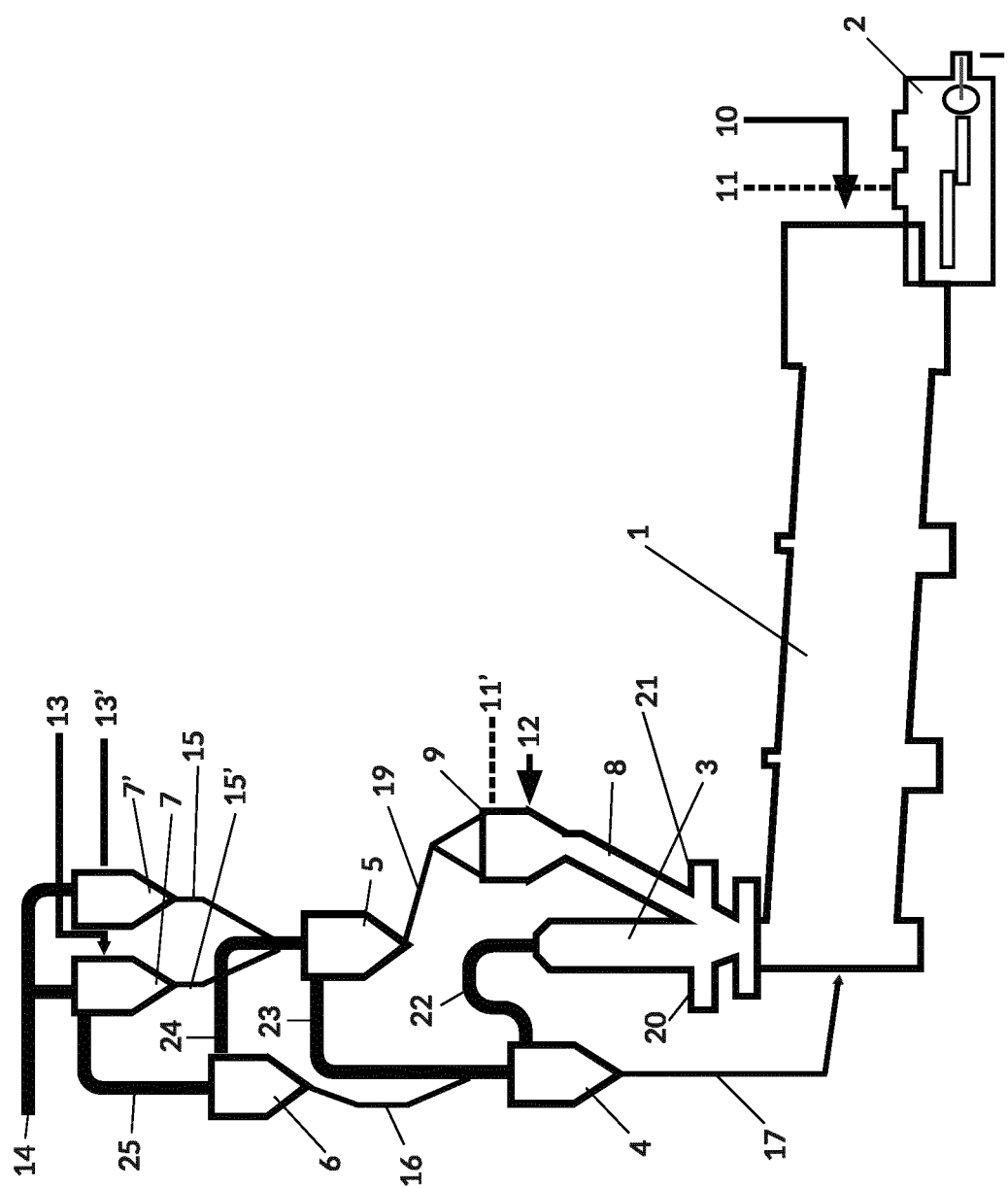
FIG. 2 is a schematic representation of a cement kiln with a pre-kiln combustion chamber, in which the process of the present invention can be performed.

FIG. 2 is a schematic representation of a cement kiln with a combustion chamber in the pre-heater tower, in which the process of the present invention can be performed.

In both figures, like numbers have like meaning.

In FIGS. 1 and 2, (1) represents the kiln, which is a large rotating pipe. The cement raw materials enter on the left side, and are transported through the kiln to the right. Clinker leaves the kiln on the right hand, and is cooled on the grate cooler (2). Instead of the grate cooler, planetary coolers can be used as well.

The clinker is thereafter milled and generally mixed with an amount of gypsum to provide a commercial product (not shown in the figure). The furnace in the kiln is fueled through line (10) with for example powdered coal. Air is blown by a fan (not shown) and the air is sucked through the system, starting at the right hand entrance of the kiln (1). The air rises through the riser pipe (3) to the first cyclone (4) via pipe (22), to cyclone (5) through pipe (23) and so on, to cyclones (6), (7), (7'), and pipes (24) and (25). The raw material enters the cyclone section, also called the preheat tower, from line (13), (13)' to cyclones (7), (7'), and tumbles down through cyclones (6), (5), (4), and—if applicable, the riser pipe (3), through lines (15), (15'), (16), (17), and (18) or (19), into the kiln (1). The riser pipe and cyclones are also called together the pre-heating tower.

FIG. 1 shows a pre-heating tower without separate combustion chamber. In the lower half of the riser pipe, preferably closer to the bottom, the secondary fuel according to the present invention can be introduced through entrance (20). The fuel has a tendency to fall, but is blown upwards because of the air flow. On the other hand, the particles have sufficient density, such that they do not rise through pipe (22) into cyclone (4). Both falling down into the kiln (1), or entering the cyclone (4) would be causing problems. In the kiln (1), $SO_2$ and/or CO will develop, while entering the cyclone (4) will cause blocking of the cyclone.

FIG. 2 shows a pre-heating tower with a pre-kiln combustion chamber. Generally, the secondary fuel is used as replacement fuel in the combustion chamber (9). It is however not excluded to insert such secondary fuel in the riser pipe (3) through entrance (20), or through entrance (21) in the pipe (8) connecting the combustion chamber (9) to the riser pipe (3), or kiln (1). It is preferred to provide the secondary fuel of the invention to the burner section of the combustion chamber (9) because the use of heated air in the pre-heater tower is optimized for use of such combustion chamber. Combustion chamber (9) has a fuel supply through pipe (12), and an air supply through line (11'). It may be of preference, that the air is for example preheated by transport through the cooler grate (2), such that air in line (11) is heated, and transported to line (11').

The invention claimed is:

1. A process for producing cement in a kiln comprising a kiln inlet, a first cyclone and a riser pipe, the process comprising providing heat to a cement clinker manufacturing process using a waste-derived fuel, wherein the waste-derived fuel comprises cellulose and plastic and is in the form of pellets of a size between about 3-25 mm thickness, having a calorific value of about 16 GJ/ton or more, and wherein said waste-derived fuel in the form of pellets is supplied at a place between the kiln inlet and the first cyclone, wherein the secondary fuel is substantially completely burned, while not entering the first cyclone or the kiln, wherein the cement clinker is cooled and milled to cement powder.

2. The process according to claim 1, wherein said waste-derived fuel is supplied to the riser pipe or to a pre-kiln combustion chamber at a place which allows the pellets to burn before coming in contact with feed materials in the kiln.

3. The process according to claim 1, wherein the process is used in cement manufacturing, wherein the pellets are provided to the riser pipe of a cement kiln operation without a pre-kiln combustion chamber.

4. The process according to claim 1, wherein the process is used in a cement kiln wherein the pellets are provided to a pre-kiln combustion chamber.

5. The process according to claim 1, wherein said waste-derived fuel is provided at a place where it is completely burned in the riser pipe, while it is sufficiently heavy, has sufficiently high density, that the waste-derived fuel is not sucked into the cyclones.

6. The process according to claim 1, wherein the pellets have a thickness of about 8 mm to about 20 mm.

7. The process according to claim 1, wherein the pellets consist of an amount of cellulose and plastic of about 40 wt % or more, (based on the weight of the dry pellets).

8. The process according to claim 1, wherein the pellets consist of an amount of plastic of about 20 wt % or more, based on the weight of the dry pellets.

9. The process according to claim 1, wherein the pellets have a calorific value of about 18 GJ/ton or more.

10. The process according to claim 1, wherein the strength of the pellets is about 5 Kgf or more, and wherein the strengths is about 70 Kgf or less.

11. The process according to claim 1, wherein the pellets individually have an average density between 0.7 and 1.3 kg/dm$^3$.

12. The process according to claim 1, wherein an amount of pellets is used in an amount to provide for an energy input of about 3% to about 50% of energy requirement.

13. The process according to claim 1, wherein the temperature of the air is about 1000° C. or lower upon exiting of the kiln.

14. The process according to claim 1, wherein the pellets individually have an average density between 0.8 to 1.2 kg/dm³.

15. The process according to claim 1, wherein an amount of pellets is used in an amount to provide for an energy input of about 5% to about 20% of energy requirement.

16. A process for producing cement in a kiln comprising a kiln inlet, a first cyclone and a riser pipe, the process comprising providing heat to a cement clinker manufacturing process using a waste-derived fuel, wherein the waste-derived fuel comprises cellulose and plastic and is in the form of pellets of a size between about 3-25 mm thickness, having a calorific value of about 16 GJ/ton or more, and wherein said waste-derived fuel in the form of pellets is supplied at a place between the kiln inlet and the first cyclone, wherein the cement clinker is cooled and milled to cement powder, wherein said waste-derived fuel is supplied to the riser pipe or to a pre-kiln combustion chamber at a place which allows the pellets to burn before coming in contact with the feed materials in the kiln, wherein the secondary fuel is substantially completely burned, while not entering the first cyclone or the kiln, wherein the pellets have a thickness of about 8 mm to about 20 mm.

17. The process for producing cement according to claim 16, wherein the temperature of the air is about 1000° C. or lower upon exiting of the kiln.

18. The process for producing cement according to claim 16, wherein an amount of pellets is used in an amount to provide for an energy input of about 5% to about 20% of energy requirement.

* * * * *